US007106214B2

(12) United States Patent
Jesadanont et al.

(10) Patent No.: US 7,106,214 B2
(45) Date of Patent: Sep. 12, 2006

(54) APPARATUS AND METHOD OF FINDING AN UNOCCUPIED PARKING SPACE IN A PARKING LOT

(76) Inventors: Mongkol Jesadanont, 386/2 Soi Ratchadaphisek 42, Chatuchak Bangkok 10900 (TH); Apijade Jesadanont, 386/2 Soi Ratchadaphisek 42, Chatuchak Bangkok 10900 (TH); Sukanya Jesadanont, 386/2 Soi Ratchadaphisek 42, Chatuchak Bangkok 10900 (TH)

( * ) Notice: Subject to any disclaimer, the term of this patent is extended or adjusted under 35 U.S.C. 154(b) by 27 days.

(21) Appl. No.: 10/818,287

(22) Filed: Apr. 6, 2004

(65) Prior Publication Data

US 2005/0237225 A1 Oct. 27, 2005

(51) Int. Cl.
*B60Q 1/48* (2006.01)

(52) U.S. Cl. .............................. 340/932.2; 340/539.1; 340/904; 340/928; 340/933; 49/49; 404/6

(58) Field of Classification Search ............. 340/932.2, 340/933, 937, 905, 942, 928, 539.1, 904, 340/908.1; 49/35, 49, 131; 404/6, 7; 701/117; 705/418; 235/377
See application file for complete search history.

(56) References Cited

U.S. PATENT DOCUMENTS

| | | | | |
|---|---|---|---|---|
| 4,894,654 | A * | 1/1990 | Serenbetz | 340/932.2 |
| 4,901,071 | A * | 2/1990 | Fletcher | 340/932.2 |
| 5,146,710 | A * | 9/1992 | Caldwell | 49/35 |
| 5,177,479 | A | 1/1993 | Cotton | |
| 5,945,907 | A | 8/1999 | Yaron et al. | |
| 6,100,818 | A * | 8/2000 | Di Berardino | 340/932.2 |
| 6,142,702 | A * | 11/2000 | Simmons | 404/6 |
| 6,147,624 | A * | 11/2000 | Clapper | 340/932.2 |
| 6,150,958 | A * | 11/2000 | Worsham | 340/932.2 |
| 6,340,935 | B1 * | 1/2002 | Hall | 340/932.2 |
| 6,426,708 | B1 * | 7/2002 | Trajkovic et al. | 340/932.2 |
| 6,531,966 | B1 | 3/2003 | Krieger | |
| 6,577,248 | B1 * | 6/2003 | Hjelmvik | 340/932.2 |
| 6,771,185 | B1 * | 8/2004 | Yoo et al. | 340/932.2 |
| 6,917,307 | B1 * | 7/2005 | Li | 340/932.2 |

* cited by examiner

*Primary Examiner*—Davetta W. Goins
(74) *Attorney, Agent, or Firm*—S. Jesadanont

(57) ABSTRACT

Apparatus and method for finding an unoccupied parking space in a parking lot using an On-Line computer system comprises barring mechanisms at a parking space having a receiver capable of receiving a specific wave energy frequency transmitting from a remote control unit. Upon receiving of such signal of matching frequency resulting in removal of the barring mechanism, permitting parking of a vehicle into such space and sending information on-line to the system computer at the entrance that the space is occupied. Upon leaving of the vehicle from the parking space, the barring mechanisms resumes and the transmitter unit at the parking space sending signal on-line to notify the computer at the entrance that such parking space is unoccupied. For a permanent parking space in condominiums or apartments, the receiver unit is assigned to receive a specific signal from a remote control for a predetermined period of time.

3 Claims, 5 Drawing Sheets

APPARATUS AND METHOD OF FINDING AN UNOCCUPIED PARKING SPACE IN A PARKING LOT

FIELD OF INVENTION

This invention relates to apparatus and method of finding an unoccupied parking space using an on-line computerized system and transceivers of electromagnetic wave.

BACKGROUND OF THE INVENTION

Presently, in a parking lot, drivers must waste so much time, energy and fuel finding an unoccupied parking space. This is most undesirable for clients of all shopping complexes. Thus, this system of computerized on-line detection of any available unoccupied parking spaces is invented to help minimizing the time for finding a parking space and the unnecessary waste of the fuel. There are presently, only the inventions that help the driver to park properly in an available parking space in a parking lot using sensors either visual or audible (U.S. Pat. No. 5,945,907), infrared or laser transmitting devices (U.S. Pat. Nos. 5,177,479 and 6,531,966) to detect the distance between the car and other objects to avoid hitting the car against a wall of a garage or any other cars or objects, thus avoid any possible damage. None yet has been invented as of this present invention which are apparatus and method of finding any unoccupied spaces available at a certain moment in a parking lot to help directing a driver to such a space with no need to spend too much of his time and effort.

SUMMARY OF THE INVENTION

Apparatus and method for finding an unoccupied parking space in a parking lot by an On-line computerized system comprises a barring mechanisms at a parking space. A driver obtains a remote control device from an authority at the entrance of a parking lot. Upon pressing a button of the remote control having a specific predetermined code matching to the receiver at that particular parking space, the barring mechanisms is removed. The vehicle can then move in to park in the parking space. The transmitter at the parking space transmits an infrared beam to detect the presence of the vehicle in the parking space where the on-line transmitting device informs the system computer that the particular space is 'occupied'. Simultaneously, the system computer informs a computer at the exit of a parking lot to start counting the time of parking. When the vehicle leaves the parking space, the barring components return to the original position to prevent any unauthorized vehicle from getting into the space. The infrared beam of a dark-on type sends the information to the system computer notifying that the particular parking space is now 'vacant'. The parking fee is charged at the exit as the driver returns the remote control to the authority at the exit.

For a long term rented parking space, the receiver of the parking space is preset to be able to receive the code from a remote control for a certain period of time.

DETAILED DESCRIPTION OF THE PREFERRED EMBODIMENTS

Figure 2:
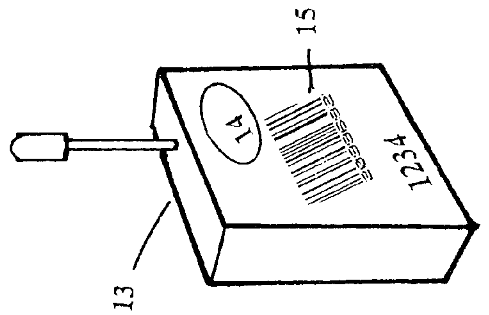
FIG. 2 is a remote control to be used in the present invention.
Figure 1:
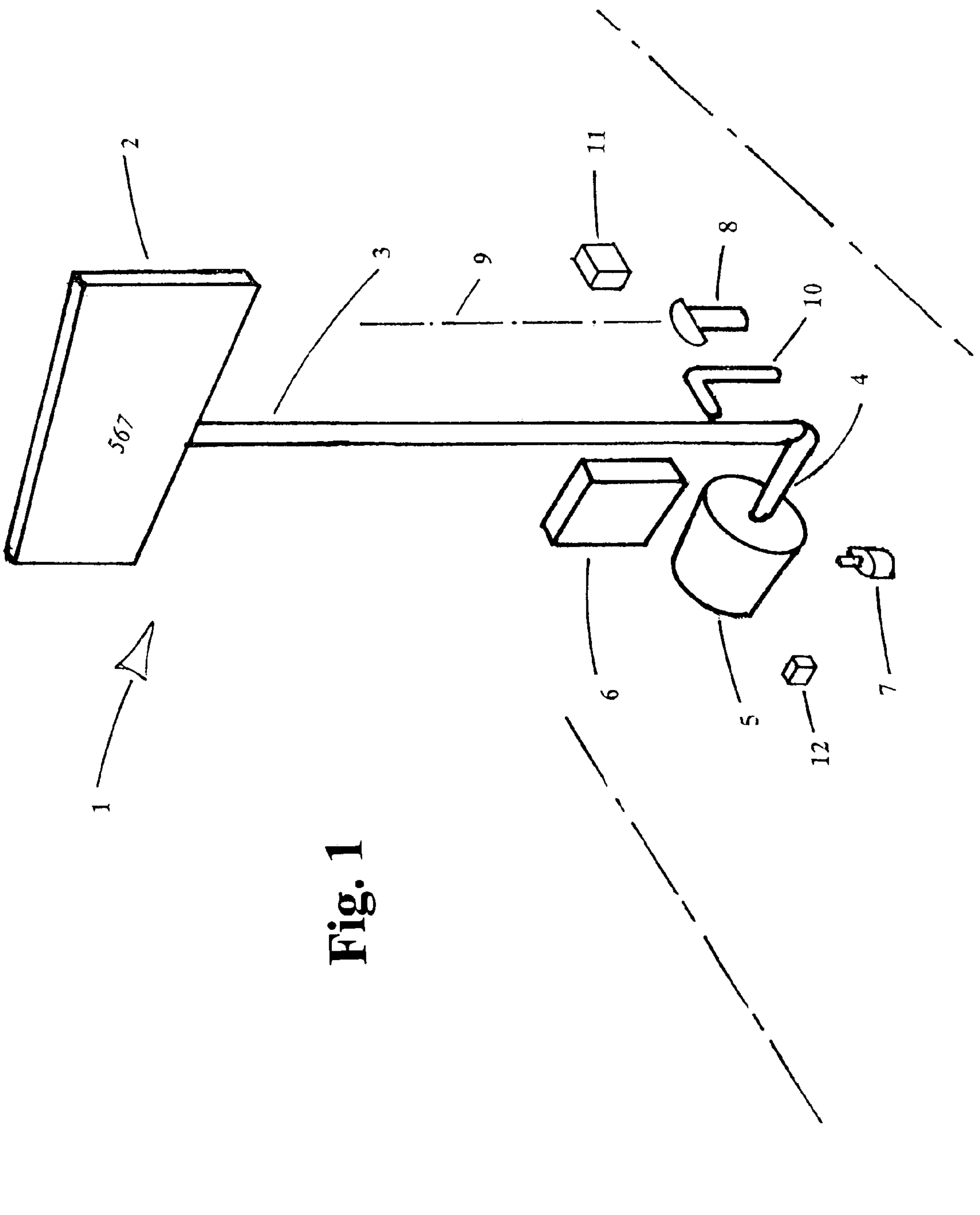
FIG. 1 is a perspective view showing the components of an on-line computerized system to be installed in a parking space.

The components for guiding a car to an unoccupied parking space comprises 3 main sets of apparatus as follows:

1. Apparatus at a parking space 1 as in FIG. 1, consists of:
   - 1.1 Receiver Unit to be used when a car is moving into a parking space, having switch 7 and receiver 6;
   - 1.2 Transmitter Unit to be used when a car is leaving the parking space, having switch 10, relay 11 and Infrared transmitter 8 to transmit an infrared beam 9;
   - 1.3 On-line Signal transmitting Device 12 to be connected to switch 7 and send information on-line to a main or system computer at the entrance of the parking lot to notify that the particular space is 'VACANT' or 'OCCUPIED'.
   - Both receiver 6 of the receiver unit and transmitter 8 of the transmitter unit are connected to a DC-motor 5.
   - 1.4 A barring mechanisms to prevent getting into the parking space of any unauthorized vehicle. This can be either mechanical or electronic devices.
   - For descriptive purpose, supposing there is a parking plate 2 having number of each parking space, for example '567', on both sides.
   - Stem 3, made of durable plastic tube or column of approximately 0.5 inch in diameter, holds plate 2 in an upright position about 3 feet above the ground of the parking space. The lowest end of stem 3 is connected to a horizontal axis 4 of the DC-motor 5.
   - Alternatively, electronic components which detect the presence of an unauthorized vehicle may be used such that an alarm may be activated to notify the authority upon invasion into such parking space.
2. Apparatus at the entrance of a parking lot comprises: a system computer, a remote control 13 (as in FIG. 2), a Bar Code Reader or Detector, with a parking lot authority functioning at the entrance booth.
3. Apparatus at the exit of the parking lot comprises : a computer, and Bar Code Reader or Detector, and with a parking lot authority.

The system functions as follows:

Switch 7 is connected to receiver 6 which is capable of receiving either radio-frequencies or infrared or any communicable forms of electromagnetic wave energy. On-line Signal transmitting Device 12 is connected to switch 7. Supposing receiver 6 receives a matching radio-frequency from remote control 13. When receiver 6 which is connected to the DC-motor 5 receives the signal from remote control 13, it commands motor 5 to turn counterclockwise. This causes plate 2 together with stem 3 turns pivotally to lie down on to the ground. Switch 10 is connected to relay 11 which is connected to infrared transmitter 8 (or any device which can communicate through any type of electromagnetic wave(s) or any communicable signal or wave energy). Transmitter 8 emits infrared beam 9 whose beam ends at about 5 feet above the ground and which is of 'switch on tailing down' or 'dark-on' type, which means that it starts functioning only after any object blocking the beam has moved away.

Transmitter 8 is also connected to motor 5 and causes motor 5 to turn clockwise and thus pivotally turn stem 3 together with plate 2 to stand upright.

Remote control 13 is the one to transmit radio-frequency or any kind of wave energy for communication where each remote control is specifically assigned—i.e. factory preset, to transmit only a specific radiofrequency unique only for that particular remote control and not for the other. This frequency can be received only by a particular matching receiver 6. Button 14 on the remote control 13 is for transmitting the radiowave to receiver 6. Thus, the wave carries code to the receiver in the same manner as a hand phone capable of transmitting a wave energy of 900 MHz sending a code of a particular wave frequency to just one particular receiver of another hand phone of a specified phone number. There on each remote control 13 is assigned a bar code 15 and an identification number of each remote control, e.g. 1234. This number '1234' is to be encoded in the system computer at the entrance and encoded for only one of the receiver 6 at that particular parking space such that only that particular receiver 6 can detect the radio-frequency from the remote control No. 1234, and not from any other remote control.

Encoding of the code to only a particular receiver 6 is performed by the authority at the entrance where he keys in the number identifying the remote control into the system computer, e.g. '1234'. This code '1234' will be on-lined to receiver 6. On the other hand, code '1234' may be keyed into the barcode reader within the remote control No. 1234. The barcode reader sends the information of code number 1234 to the computer and the computer processes and sends the code '1234' to receiver 6.

All the components 1–12 is installed at the outer edge of each parking space. Their dimension and location are designed such that none will be run over by any of the tires of the vehicle and there will not be contact to any part underneath of the car nor the chassis while the car is parking in the described parking space nor while it is moving out from the parking space.

Alternatively, the components may be installed at the ceiling just above the parking space where the mechanisms may be of mechanical or electronics devices.

The area of each parking space is indicated by the dotted line.

Figure 3:
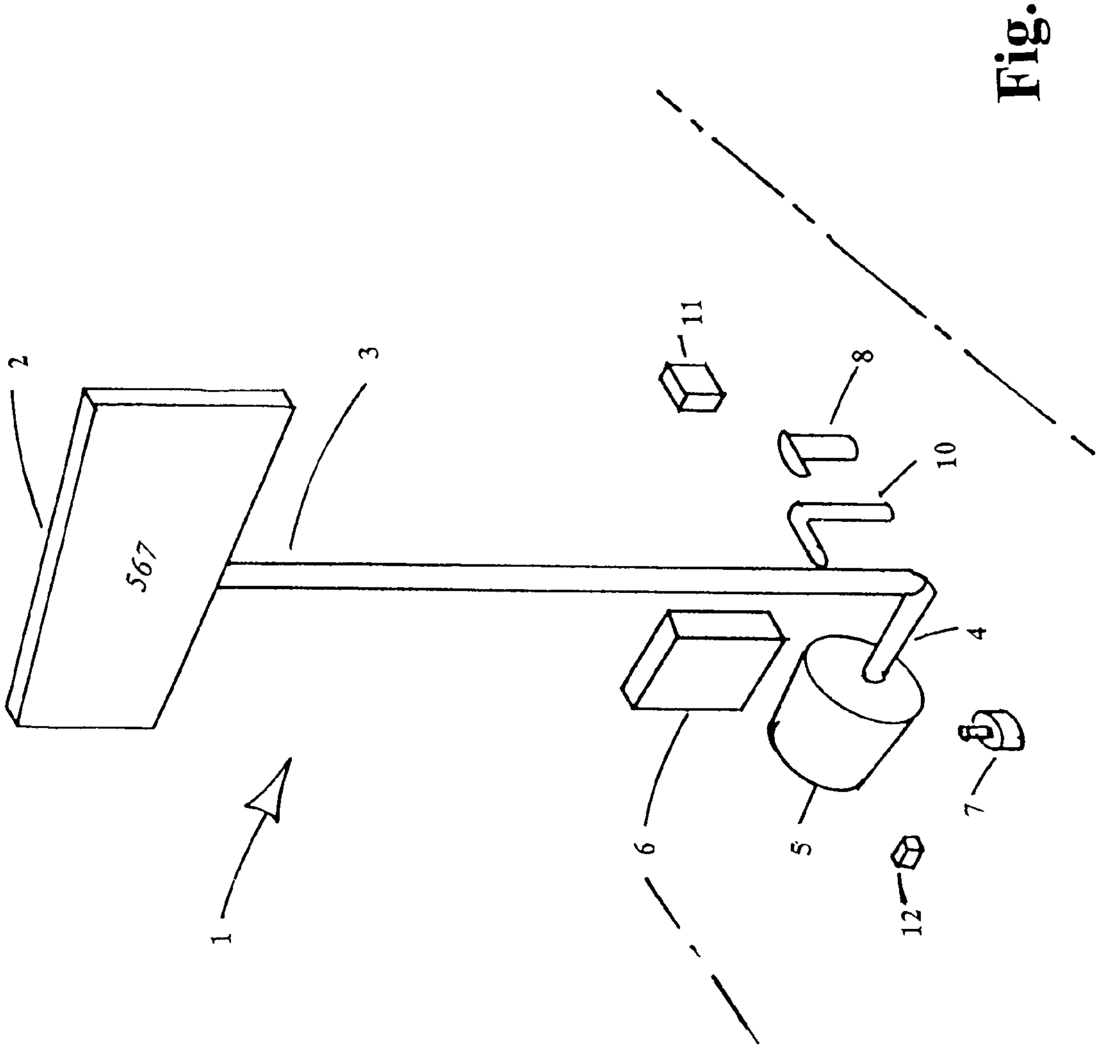
FIG. 3 is a perspective view of an unoccupied parking space with its parking plate No. '567' in an upright position.

As shown in FIG. 3, assuming a parking space No. 567 of row A on the $20^{th}$ floor of the parking lot is unoccupied with a message 'VACANT' shown on the monitor of the system computer. When a parking space is unoccupied, all the component 1–12 will be in the position as in FIG. 3.

Stem 3 is standing upright and thus presses switch 10 into an 'OFF' position. Thus, there will not be any electric current into relay 11 and transmitter 8, causing transmitter 8 to be in 'OFF' position and no emission of infrared beam 9.

In this situation, switch 7 is in an 'ON' position, and it allows supply of electric current to receiver 6. Receiver 6 is therefore in a ready-to-function position or 'STAND-BY' mode. When switch 7 is in an 'ON' position, transmitter 12 transmits a message to appear on the monitor of the system computer that 'space no. 567, row A, $20^{th}$ floor—"VACANT"'.

To direct to a vacant parking space can be done as follows:

The parking lot authority at the entrance keys No. '1234' in the computer or using the barcode reader 15 to key number '1234'. The system computer will send the message on-line to receiver 6 which is in a stand-by mode at the parking space 567 at row A of $20^{th}$ floor and the number 1234 is encoded into the memory of receiver 6 where receiver 6 is able only to detect or receive only the wave energy code from the remote control 1234 and never any other wave energy from any other remote control.

The system computer simultaneously sends the message on-line to the computer at the exit informing that remote control no. 1234 has been handed out to a car entering in the parking lot. The computer at the exit registered and then starts counting the time of parking of that car utilizing the remote control no. 1234 thus the fee for parking can be calculated.

Figure 4:
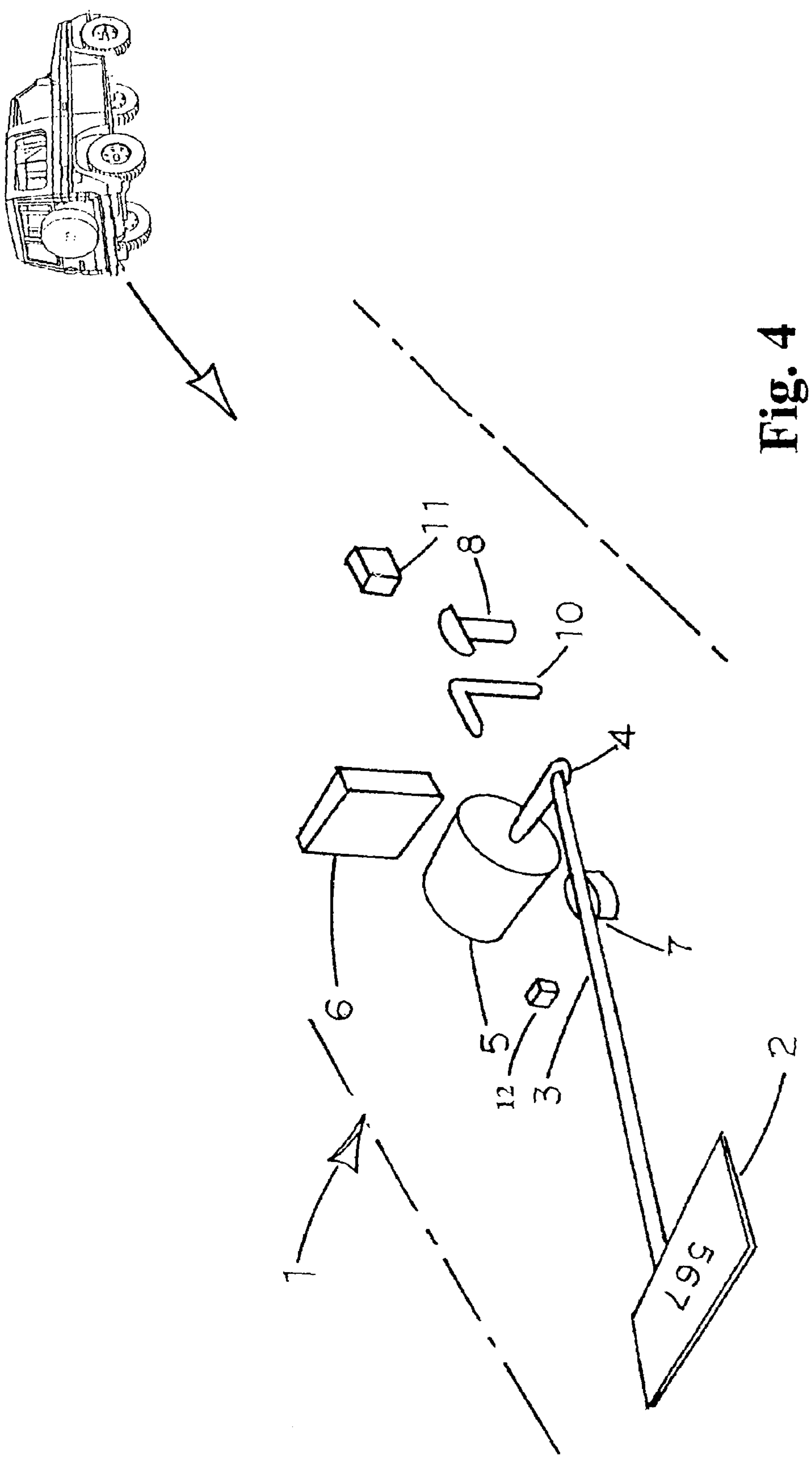
FIG. 4 shows the parking plate is in a 'laid down' position upon receiving a wave signal of a matched wave energy from the remote control while a car is moving into the parking space.
Figure 5:
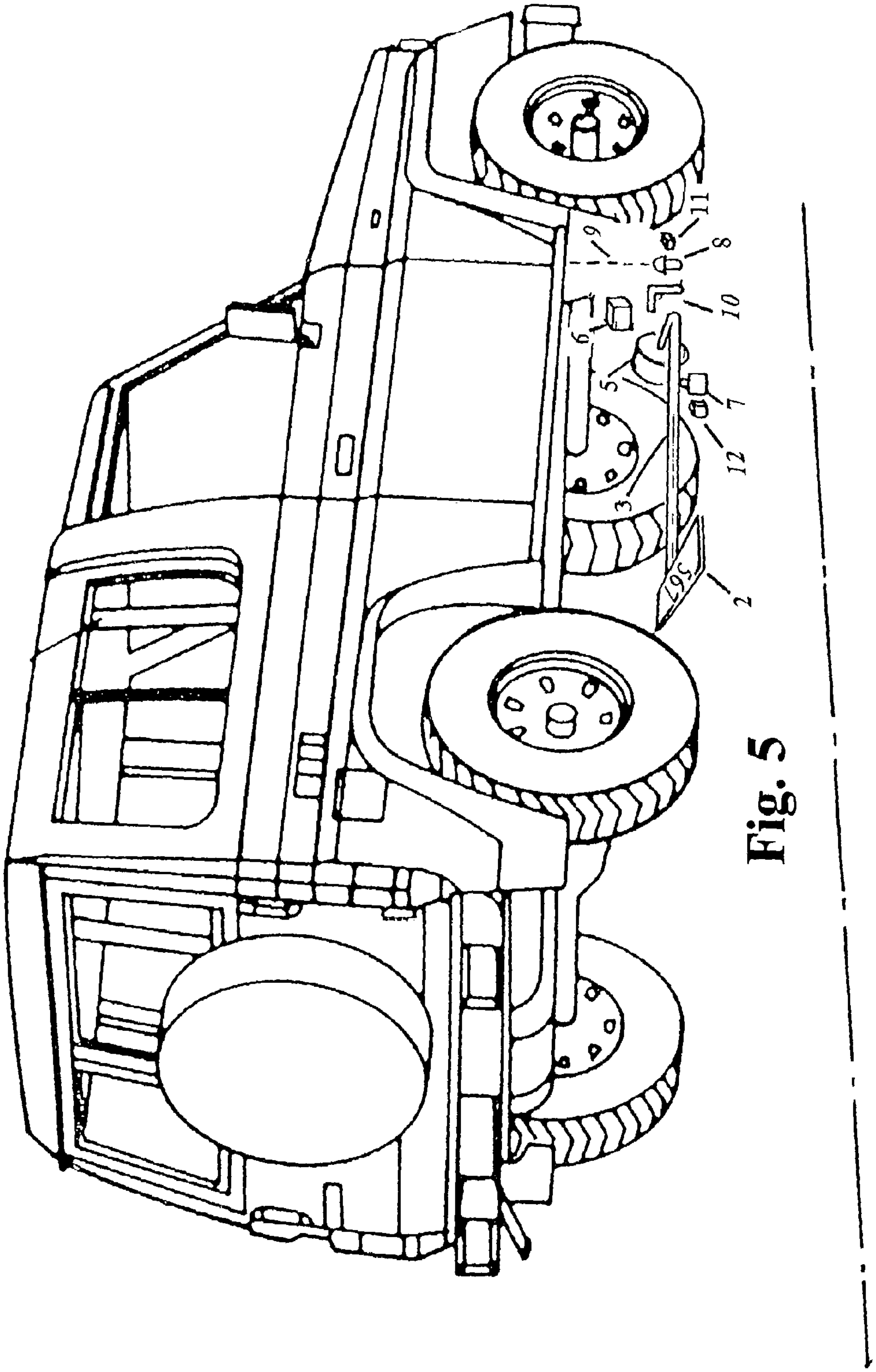
FIG. 5 shows all the components of an occupied parking space.

FIG. 4 shows how all the components function upon receiving the radio-wave signal from the remote control 13 when a car is about to move into the parking space. When a car arrives and before getting into the parking space 567, row A on $20^{th}$ floor, the driver presses button 14 of remote control 13 to transmit radio-wave signal to receiver 6. Receiver 6 commands motor 5 to turn counterclockwise causing stem 3 together with plate 2 to lie pivotally down horizontally. The barring mechanisms is removed. The car can thus move into parking space 567 as in FIG. 5. Stem 3 then presses on switch 7 causing switch 7 to be in 'OFF' position. The recorded code in memory of receiver 6 is then decoded automatically. The on-line Signal transmitting Device 12 stops transmitting the signal and the message 'VACANT' indicating 'parking space 567, row A on $20^{th}$ floor is vacant' is changed to 'OCCUPIED' on the monitor of the computer which means that such space is now occupied.

When the code is decoded from the receiver 6 as the electric current stops supplying to receiver 6. Receiver 6 thus can not receive any wave signal from any remote control.

In this manner, switch 10 turns to an 'ON' position. There should be electrical supply to transmitter 8, but relay 11 causes delay of electric supply that transmitter 8 can not yet transmit infrared beam 9 for a preset period of time until the car has moved into and parked properly in the parking space. The sequence is as follows:

1. When button 14 on remote control no. 1234 is pressed, motor 5 turns counterclockwise. The lower end of stem 3 moves pivotally away from pressing on switch 10 and allow switch 10 to be in 'ON' position. If there is no relay 11, electric current will supply immediately to transmitter 8 causing transmitter 8 to transmit infrared beam instantaneously. If such happens, and if the driver needs to move the car a few times before the car can be properly parked, then the car will be moving in and out of the parking space and thus will block the infrared beam on and off also for a few time. If there is no relay 11, when the car moves away from the infrared beam, motor 5 is commanded to turn clockwise by transmitter 8 and thus stem 3 together with plate 2 will move pivotally upright to be in the way and prevent the car to get in. This will be quite awkward upon parking a car. Relay 11 must then be added to delay the functioning of transmitter 8 to allow smooth parking of a car.

2. Once the car get into the parking space properly, and relay 11 does not delay the signal any further. Relay 11 commands transmitter 8 to transmit infrared beam 9 up vertically. The underneath of the car blocks beam 9 at all time while the car is parking.

Figure 6:
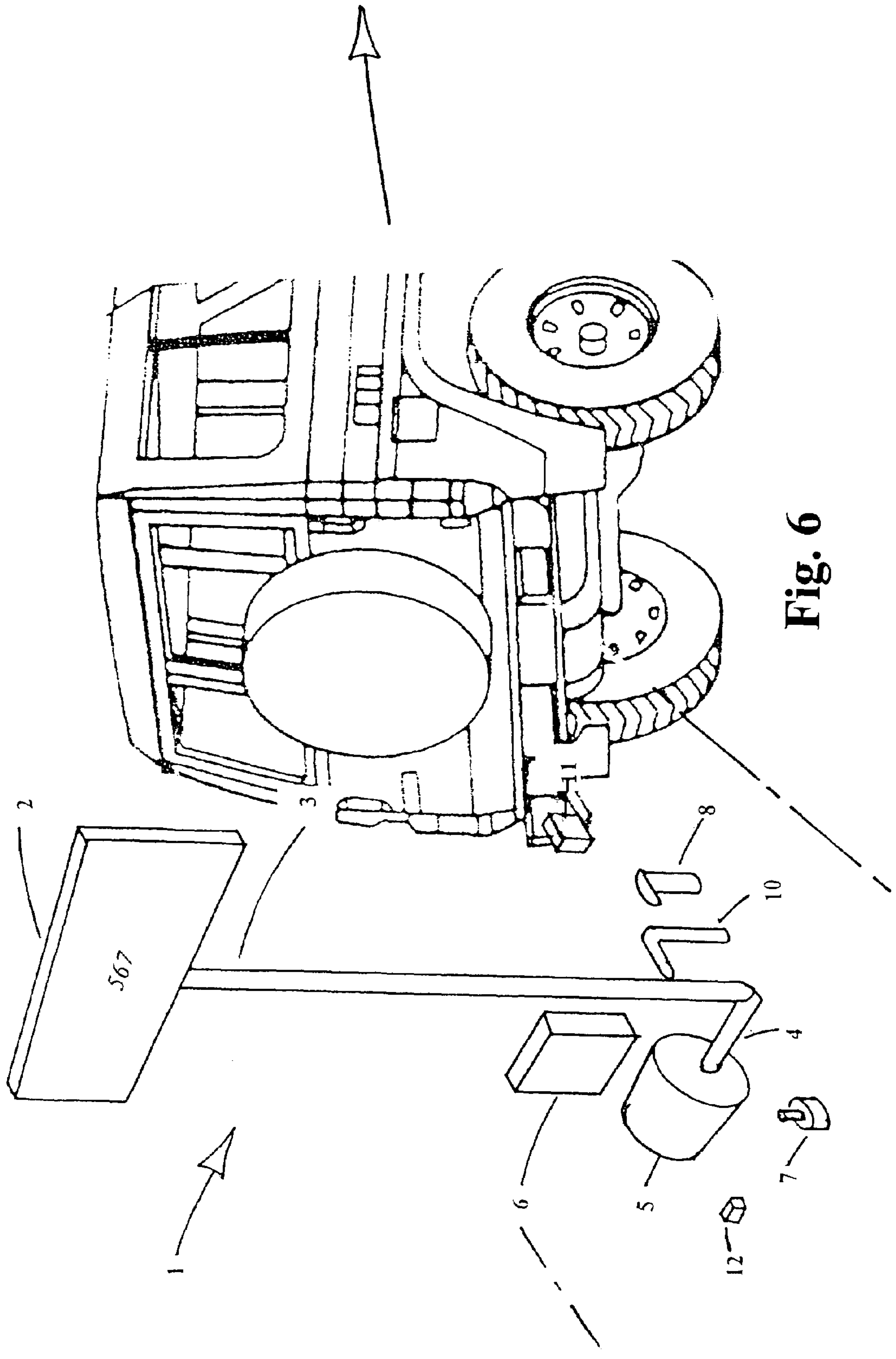
FIG. 6 shows all the components upon returning to an unoccupied parking space status when a car is moving away.

3. As shown in FIG. 6, after the car has moved away from the parking space, infrared beam 9 is not blocked any longer. Transmitter 8 then commands motor 5 to turn clockwise until stem 3 and plate 2 turn pivotally upright and the lower part of stem 3 presses against switch 10 to turn switch 10 to be in 'OFF' position. Transmitter 8 stops transmitting infrared beam 9. Switch 7 then turns to 'ON' position causing receiver 6 to return to 'stand-by' mode. The on-line signal transmitting device 12 then send message 'VACANT' to reappear on the monitor of the system computer at the entrance for 'parking space 567, row A on $20^{th}$ floor. All the components of the parking space 567 get back to the position as in FIG. 3 once again.

4. Arriving at the exit of the parking lot, the driver hands the remote control no. 1234 back to the authority at the exit. The barcode is read by the barcode reader. The parking fee is calculated. The driver pays the fee and departs the parking lot.

In the condominiums or the renting apartments, mostly each parking is rented for a longer period of time, monthly or annually. The remote control can be preset to transmit a particular wave energy to match with the receiver of such particular parking space for the time rented.

In the present invention, the receiver unit can be any of the wave energy detector(s) and the transmitter unit can be any of the wave energy source(s) which can communicate to allow appropriate best functioning of the above described system.

Alternatively, instead of handing a remote control to the driver, the authority at the entrance may inform the driver of the available parking space and operate to remove the barring mechanisms from a distance although using a remote control would provide convenience to the driver and lower the cost for installation of the whole system.

It will be understood that modifications can be made in the above description without departing from the scope of this invention by one of ordinary skill in the art. It is accordingly intended that all matter contained in the above description be interpreted as descriptive and illustrative rather than in a limiting sense.

It is also to be understood that the following claims are intended to cover all of the generic and specific features of the invention as described herein, and all statements of the scope of the invention which, as a matter of language, might be said to fall therebetween.

We claim:

1. Apparatus for finding an unoccupied parking space in a parking lot with an on-line computer system comprises 3 main sets of apparatus which are apparatus at the entrance of said parking lot, apparatus at each parking space, and apparatus at the exit of said parking lot, where said apparatus at the entrance of the parking lot and said apparatus at the exit of the parking lot each comprises a remote control, a bar code reader and a system computer where each has an operator working at site, and said apparatus at said each parking space comprises Receiver Unit with a switch and a wave energy receiver having a memory;

Transmitter Unit with a switch, a relay and a wave energy transmitter to transmit an infrared beam;

On-line signal transmitting device connected to said system computer at the entrance to notify whether said parking space is occupied or vacant;

Barring mechanisms to allow only permitted vehicle to park in said parking space;

and whereof said remote control unit of said apparatus at entrance and at exit transmits wave energy of an assigned frequency to said receiver of said apparatus at said parking space, where said remote control also has a number and a specific bar code to be pressed or transmitted as a code to said receiver.

2. Method for finding an unoccupied parking space in a parking lot of an on-line computerized system comprises steps of:

Indicating on-line of an unoccupied parking space on the monitor of a system computer;

Handing by an entrance operator to a driver of a vehicle a remote control unit able to transmit a wave energy of specific frequency communicable with said receiver at said unoccupied parking space;

Driving to said unoccupied parking space;

Pressing a button of said remote control to allow communication to said receiver resulting in removal of any barring mechanisms;

Sending information on-line to said system computer that said parking space is 'OCCUPIED';

Moving of said vehicle into said parking space;

Obscuring an infrared beam of dark-on type transmitted vertically at said parking space by said vehicle;

Leaving of said vehicle away from obscuring said infrared beam causes all the barring mechanisms to resume to original position and prevent getting in of any unauthorized vehicle where signal is transmitted on-line to said system computer at said entrance to notify that said parking space is now 'VACANT';

Handing of said remote control back to an operator at said exit of said parking lot;

Reading of said bar code of said remote control and calculating of time and thus fee of parking;

Paying of parking fee by said driver.

3. A permanently rented parking space where said remote control as of claim 1 is preset to transmit a particular wave energy to match with the receiver of such particular parking space for a predetermined period of time.

* * * * *